United States Patent
Yoshida

(10) Patent No.: US 10,148,201 B2
(45) Date of Patent: Dec. 4, 2018

(54) MOTOR DRIVE DEVICE

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/890,627

(22) Filed: Feb. 7, 2018

(65) Prior Publication Data
US 2018/0234035 A1    Aug. 16, 2018

(30) Foreign Application Priority Data

Feb. 10, 2017 (JP) .................... 2017-023014

(51) Int. Cl.
H02P 3/14    (2006.01)
H02P 3/18    (2006.01)
H02P 27/06   (2006.01)

(52) U.S. Cl.
CPC .......... *H02P 3/18* (2013.01); *H02P 27/06* (2013.01)

(58) Field of Classification Search
CPC ...... H02P 1/00; H02P 1/04; H02P 1/16; H02P 1/26; H02P 1/42; H02P 1/44; H02P 1/445;
(Continued)

(56) References Cited

U.S. PATENT DOCUMENTS 8,110,948 B2 *  2/2012  Su .................. B60L 11/1887
                                                 307/82
8,773,870 B2    7/2014  Fujita et al.
(Continued)

FOREIGN PATENT DOCUMENTS

JP    2-246794    10/1990
JP    7-29781     1/1995
(Continued)

OTHER PUBLICATIONS

Ishida Masahiko, "Add rated voltage via resistor, Reduce charging current, take a long energization time", Radio technology, published Dec. 1, 1999 vol. 53, No. 12, pp. 168-169 (with machine translation).

*Primary Examiner* — Antony M Paul
(74) *Attorney, Agent, or Firm* — Wenderoth, Lind & Ponack, L.L.P.

(57) ABSTRACT

A motor drive device includes a forward converter, reverse converter, DC link capacitor, voltage detection part, first storage part storing a threshold for the non-energized period in which the leakage current of the capacitor increases and a threshold for the applied voltage for reducing the leakage current of the capacitor, a second storage part that records a previous energization period of the capacitor, and a control part, in which the control part obtains the non-energized period of the capacitor based on the previous energization period recorded, during activation of the motor drive device, and in a case of the non-energized period obtained being longer than the threshold for the non-energized period stored, causes regeneration operation from the motor to the power supply to stop, and causes the voltage of the capacitor to rise up to the threshold for the applied voltage stored, by way of deceleration energy of the motor.

5 Claims, 2 Drawing Sheets

(58) Field of Classification Search
CPC ...... H02P 1/46; H02P 3/00; H02P 3/14; H02P
3/26; H02P 6/00; H02P 6/002; H02P
6/24; H02P 11/00; H02P 11/04; H02P
11/06; H02P 23/00; H02P 23/0027; H02P
25/00; H02P 25/021; H02P 25/04; H02P
27/00; H02P 27/02; H02P 27/04; H02P
27/047; H02P 27/06; H02P 27/08; H02P
27/14; H02P 2005/007; H02P 2005/1616;
H02P 2005/4007; H02P 2005/41; H02P
2005/402; H02P 2201/05; B60L 7/00;
B60L 7/10; B60L 7/22
USPC .......... 318/400.01, 700, 701, 727, 759, 794,
318/795, 375, 376, 800, 801; 363/40, 44,
363/95, 120, 175
See application file for complete search history.

(56) References Cited

U.S. PATENT DOCUMENTS

| | | |
|---|---|---|
| 9,130,541 B2 | 9/2015 | Hoene et al. |
| 9,515,484 B2 * | 12/2016 | Huang ..................... H02J 1/06 |
| 2012/0163045 A1 | 6/2012 | Fujita et al. |
| 2013/0162183 A1 | 6/2013 | Philippart |
| 2014/0312966 A1 | 10/2014 | Hoene et al. |

FOREIGN PATENT DOCUMENTS

| | | |
|---|---|---|
| JP | 2006-54947 | 2/2006 |
| JP | 2011-72175 | 4/2011 |
| JP | 2014-241711 | 12/2014 |

* cited by examiner

MOTOR DRIVE DEVICE

This application is based on and claims the benefit of priority from Japanese Patent Application No, 2017-023014, filed on 10 Feb. 2017, the content of which is incorporated herein by reference.

BACKGROUND OF THE INVENTION

Field of the Invention

The present invention relates to a motor drive device having a leakage current reduction function for a DC link capacitor.

Related Art

A motor drive device has been known that drives the motors within machine tools, industrial machines, forge rolling machines, injection molding machines or various robots (for example, refer to Patent Documents 1 to 3). FIG. 3 is a view showing one example of such a motor drive device. The motor drive device 1X shown in FIG. 3 includes a forward converter 11 that converts three-phase AC power from an AC power supply 2 into DC power, and a reverse converter 12 that converts the DC power from the forward converter 11 into three-phase AC power, and supplies the three-phase AC power to a motor 3. A DC link capacitor 13 is provided to a DC link part between the forward converter 11 and reverse converter 12.

Patent Document 1: Japanese Unexamined Patent Application, Publication No. 2014-241711
Patent Document 2: Japanese Unexamined Patent Application, Publication No. 2011-72175
Patent Document 3: Japanese Unexamined Patent Application, Publication. No. H02-245794
Patent Document 4: Japanese Unexamined Patent Application, Publication No. H07-29781

SUMMARY OF THE INVENTION

An electrolytic capacitor made using an electrolyte such as an aluminum electrolytic capacitor may be used as the DC link capacitor of the motor drive device. For an electrolytic capacitor, when energization is not performed over a long period of time (e.g., about two years or more for an aluminum electrolytic capacitor), the leakage current will increase.

Concerning this point, Patent Document 4 discloses a self-repairing circuit of a tantalum capacitor that can decrease the leakage current, when the leakage current of the tantalum capacitor has increased. This circuit monitors the voltage of the tantalum capacitor, and applies a constant DC voltage (threshold voltage at which oxide film inside of the tantalum capacitor is repaired, e.g., 5 V to 10 V) to the tantalum capacitor, when the voltage of the tantalum capacitor is no more than a predetermined voltage. The oxide film inside of the tantalum capacitor is thereby repaired, and the flaw of leakage current of the tantalum capacitor is repaired.

The present invention has an object of providing a motor drive device that can reduce the leakage current of a DC link capacitor.

(1) A motor drive device (e.g., the motor drive device 1 described later) according to the present invention is a motor drive device that inputs AC power from a power supply (e.g., the power supply 2 described later) to drive a motor (e.g., the motor 3 described later), the motor drive device including: a forward converter (e.g., the forward converter 11 described later) that converts the AC power from the power supply into DC power; a reverse converter (e.g., the reverse converter 12 described later) that converts the DC power from the forward converter into AC power, and supplies to the motor; a DC link capacitor (e.g., the DC link capacitor 13 described later) provided to a DC link part between the forward converter and the reverse converter; a voltage detection part (e.g., the voltage detection part 14 described later) that detects voltage of the DC link capacitor; a first storage part (e.g., the first storage part 15 described later) that stores in advance a threshold for a non-energized period of the DC link capacitor in which leakage current of the DC link capacitor increases, and a threshold for applied voltage of the DC link capacitor for causing the leakage current of the DC link capacitor to decrease; a second storage part (e.g., the second storage part 16 described later) that records a previous energization period of the DC link capacitor; and a control part (e.g., the control part 17 described later) that controls voltage of the DC link capacitor, in which the control part obtains the non-energized period of the DC link capacitor based on the previous energization period recorded in the second storage part, during activation of the motor drive device, and in a case of the non-energized period obtained being longer than the threshold for the non-energized period stored in the first storage part, causes regeneration operation from the motor to the power supply to stop after causing the motor to accelerate, and causes the voltage of the DC link capacitor to rise up to the threshold for the applied voltage stored in the first storage part, based on the voltage detected by the voltage detection part, by way of deceleration energy of the motor.

(2) In the motor drive device described in (1), the control part may cause regeneration operation from the motor to the power supply to start, when the voltage of the DC link capacitor detected by the voltage detection part reaches the threshold for the applied voltage stored in the first storage part.

(3) In the motor drive device described in (1) or (2), the control part may cause regeneration operation from the motor to the power supply to stop by causing operation of the forward converter to stop.

(4) In the motor drive device described in any one of (1) to (3), the control part may cause regeneration operation from the motor to the power supply to stop after causing the motor to accelerate, in a case of the non-energized period obtained being longer than the threshold for the non-energized period, during activation of the motor drive device.

(5) In the motor drive device described in any one of (1) to (4), the first storage part externally allows for rewriting of the threshold for the non-energized period and the threshold for the applied voltage.

According to the present invention, it is possible to provide a motor drive device that can reduce the leakage current of a DC link capacitor.

DETAILED DESCRIPTION OF THE INVENTION

Hereinafter, an example of an embodiment of the present invention will be explained by referencing the drawings. It should be noted that the same reference symbols shall be attached to identical or corresponding portions in the respective drawings.

Figure 1:
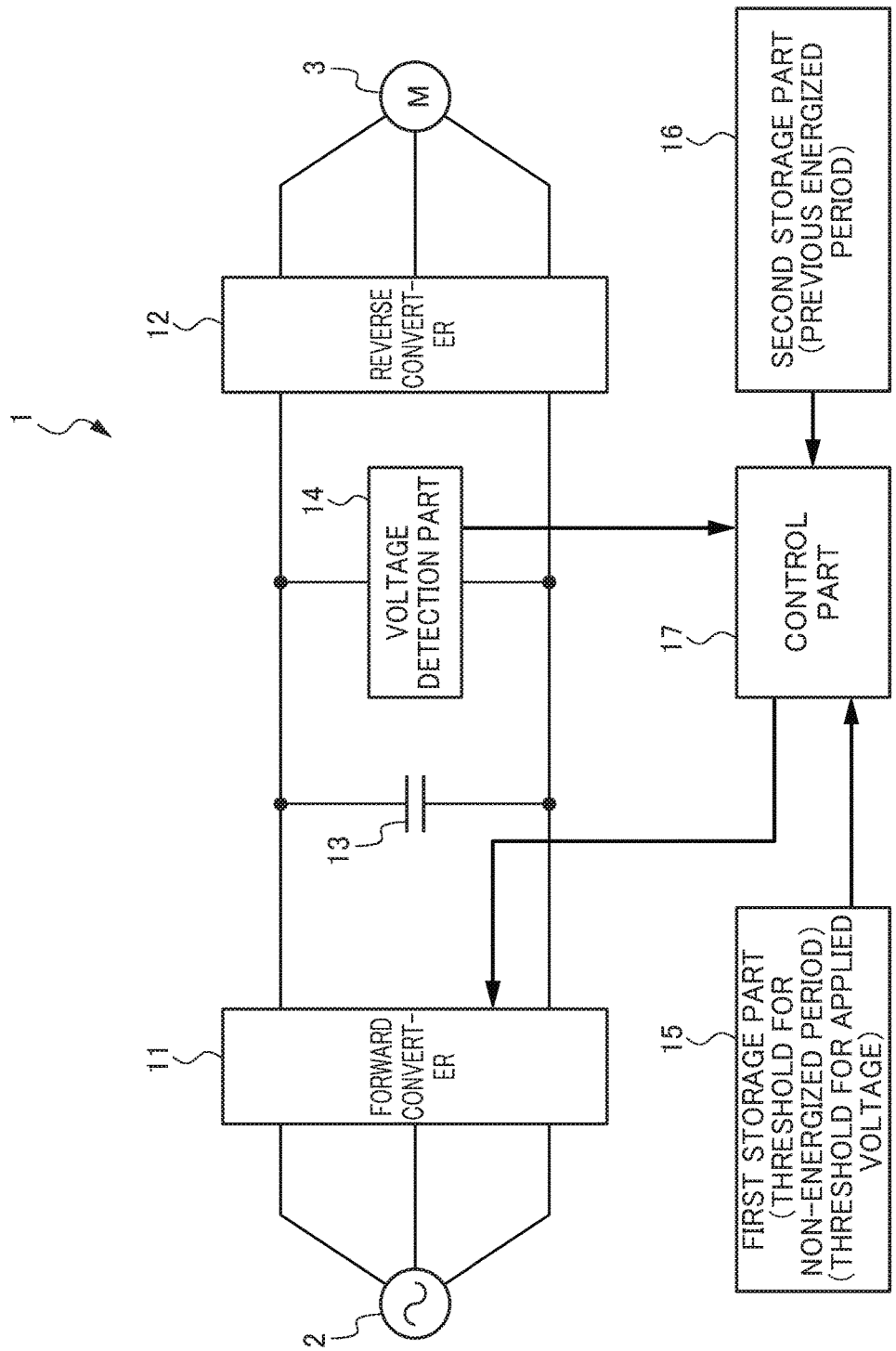
FIG. 1 is a view showing a circuit configuration of a motor drive device according to an embodiment of the present invention.

FIG. 1 is a view showing a circuit configuration of a motor drive device according to an embodiment of the present invention. The motor drive device 1 shown in FIG. 1 inputs three-phase AC power from a commercial three-phase AC power supply 2 to drive a motor 3. It should be noted that the AC power supply 2 is not limited to three-phase alternating current, and may be single-phase alternating current, for example.

The motor drive device 1 includes a forward converter 11, reverse converter 12, DC link capacitor 13, voltage detection part 14, a first storage part 15, a second storage part 16, and a control part 17.

The forward converter 11 converts the AC power from the AC power supply 2 into DC power. The forward converter 11, for example, is configured by a diode rectifying converter or PWM converter having a bridge circuit of power semiconductor devices and diodes connected reversely parallel to the power semiconductor devices.

The reverse converter 12 converts the DC power from the forward converter 11 into AC power, and supplies this AC power to the motor 3. The reverse converter 12, for example, is configured from a bridge circuit having power semiconductor devices and diodes connected reversely parallel to the power semiconductor devices. The reverse converter 12 converts the DC voltage into an AC voltage of a desired waveform and frequency, by on-off controlling (e.g., PWM controlling) these power semiconductor devices according to the commands from a control unit (not illustrated).

In addition, the reverse converter 12 converts the AC power regenerated from the motor 3 into DC power, and supplies this DC power to a DC link part between the reverse converter 12 and forward converter 11.

The DC link capacitor 13 is provided to the DC link part between the forward converter 11 and reverse converter 12. The DC link capacitor 13 stores the DC power from the forward converter 11 and the DC power (regeneration power) from the reverse converter 12. In addition, the DC link capacitor 13 smooths the DC voltage converted by the forward converter 11 or reverse converter 12. The DC link capacitor 13 is an electrolytic capacitor made using an electrolyte such as an aluminum electrolytic capacitor.

The voltage detection part 14 is provided in parallel with the DC link capacitor 13, and detects the voltage between both terminals of the DC link capacitor 13. As the voltage detection part 14, it is possible to use an existing voltage detection circuit, for example.

A first storage part 15 stores in advance the threshold for a non-energized period of the DC link capacitor 13 in which the leakage current of the DC link capacitor 13 increases (e.g., threshold of non-energized period of aluminum electrolytic capacitor is about two years). In addition, the first storage part 15 stores in advance a threshold for the applied voltage of the DC link capacitor 13 for causing the leakage current of the DC link capacitor 13 to decrease. More specifically, the threshold for the applied voltage is the rated voltage value for the DC link capacitor 13.

A second storage part 16 records a prior energization period of the DC link capacitor 13, during a previous suspension of the motor drive device 1.

The first storage part 15 and second storage part 16 are rewritable memory such as EEPROM, for example. The first storage part 15 is thereby able to rewrite the threshold for the non-energized period and threshold for applied voltage by way of an external device such as a computer, for example. In addition, the first storage part 15 or second storage part 16 stores predetermined software (programs) for realizing the various functions of the control part 17.

The control part 17 controls the voltage of the DC link capacitor 13. The control part 17, during activation of the motor drive device 1, for example, recognizes the present energization period of the DC link capacitor 13 based on information related to the time acquired from outside, and obtains the non-energized period of the DC link capacitor 13, based on the recognized present energization period and the previous energization period (time instant) recorded in the second storage part 16. Then, in the case of the obtained non-energized period being longer than the threshold for the non-energized period stored in the first storage part 15, the control part 17 causes regeneration operation from the motor 3 to the AC power supply 2 to be stopped after causing the motor 3 to accelerate. More specifically, the control part 17 causes operation of the forward converter 11 to stop.

The control part 17 thereby causes the voltage of the DC link capacitor 13 to rise up to the threshold for applied voltage stored in the first storage part 15, based on the voltage detected by the voltage detection part 14, by way of the deceleration energy from the motor 3.

In addition, the control part 17 causes regeneration operation from the motor 3 to the AC power supply 2 to start, when the voltage of the DC link capacitor 13 detected by the voltage detection part 14 reaches the threshold for the applied voltage stored in the first storage part 15. More specifically, the control part 17 causes operation of the forward converter 11 to start.

The deceleration energy from the motor 3 is regenerated in the AC power supply 2, and the voltage of the DC link capacitor 13 is thereby prevented from rising higher than the threshold for applied voltage, i.e. rated voltage value of the DC link capacitor 13.

In addition, during stop of the motor drive device 1, for example, the control part 17 recognizes the energization end time of the DC link capacitor 13 based on information related to a time instant acquired from outside, and updates the previous energization period of the DC link capacitor 13 recorded in the second storage part 16.

The control part 17 is configured by an arithmetic processor such as a DSP (Digital Signal Processor) or FPGA (Field-Programmable Gate Array), for example. The functions of the control part 17 are realized by executing predetermined software (programs) stored in the first storage part 15 or second storage part 16. The functions of the control part 17 may be realized by cooperation between hardware and software, or may be realized by only hardware (electronic circuits).

Herein, for the electrolytic capacitor made using electrolyte such as an aluminum electrolytic capacitor used in the DC link capacitor 13, when energization is not performed over a long period of time (e.g., about two years or more for an aluminum electrolytic capacitor), the leakage current will increase. However, by applying the rated voltage, the electrolytic capacitor can cause the leakage current to decrease by the repairing action of electrolyte.

However, the DC link capacitor 13 is designed so as to having a higher rated voltage than the peak value for the voltage inputted from the AC power supply 2. For example, in the case of the effective value of the power supply voltage being 200 Vrms, the peak value for the power supply voltage will be 200 V×√(2)=283 Vdc. In this case, a capacitor having a rated voltage of 450 Vdc is used as the DC link capacitor 13. For this reason, by simply applying the power supply voltage (peak value) to the DC link capacitor 13 by activating the motor drive device 1, it is not possible to apply the rated voltage to the DC link capacitor 13, and not possible to cause the leakage current to decrease.

Therefore, the present embodiment uses the deceleration energy (regeneration energy) of the motor 3 to cause the voltage of the DC link capacitor 13 to rise up to the rated voltage value or vicinity thereof, thereby decreasing the leakage current of the DC link capacitor 13.

Figure 2:
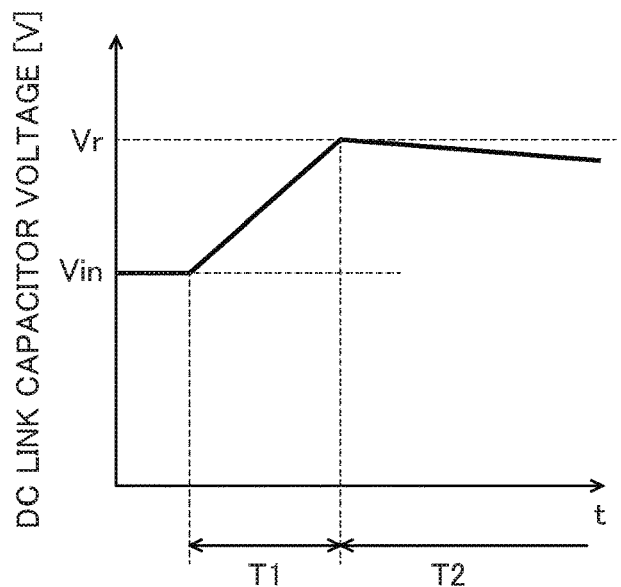
FIG. 2 is a graph showing the time course of the voltage of the DC link capacitor during reduction operation for leakage current of the DC link capacitor by the motor drive device according to an embodiment of the present invention.
Figure 3:
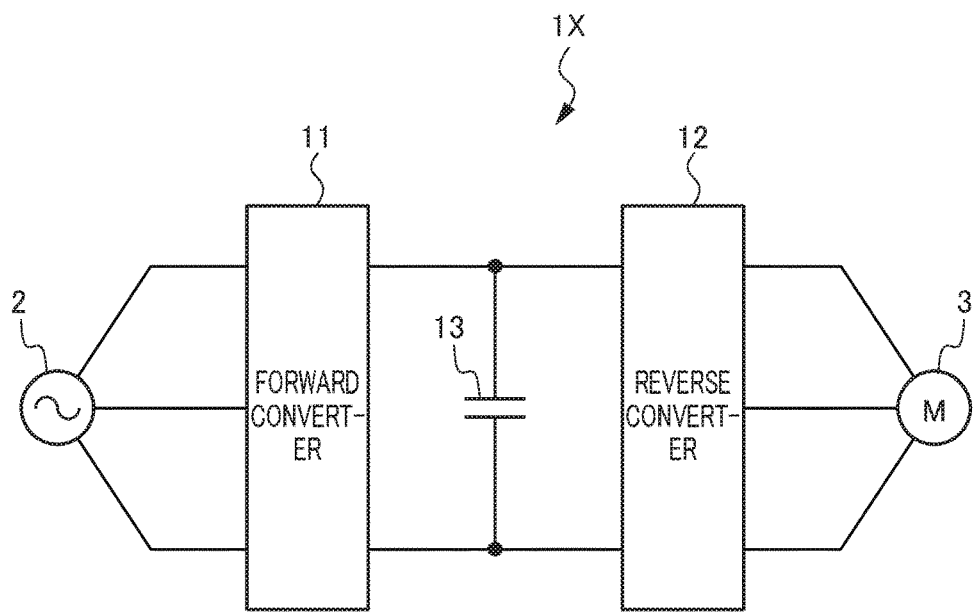
FIG. 3 is a view showing a circuit configuration of a conventional motor drive device.

Hereinafter, the reduction operation for the leakage current of the DC link capacitor 13 by way of the motor drive device 1 will be explained by referencing FIG. 2. FIG. 2 is a graph showing the time course for the voltage of the DC link capacitor 13 during reduction operation for the leakage current of the DC link capacitor 13 by the motor drive device 1.

During activation of the motor drive device 1, the control part 17 recognizes the present energization period of the DC link capacitor 13, and obtains the non-energized period of the DC link capacitor 13 based on the present energization period thus recognized, and the previous energization period (time instant) recorded in the second storage part 16.

Next, in the case of the obtained non-energized period being longer than the threshold for the non-energized period stored in the first storage part 15, the control part 17 causes the motor to decelerate after temporarily causing the motor 3 to accelerate. At this time, the control part 17 causes the regeneration operation from the motor 3 to the AC power supply 2 to stop after causing the motor 3 to accelerate. More specifically, the control part 17 causes operation of the forward converter 11 to stop, by causing the supply of control voltage to the switching element of a forward converter 11 to stop.

The control part 17 thereby causes the voltage of the DC link capacitor 13 to rise up to the threshold for the applied voltage stored in the first storage part 15, i.e. rated voltage value yr, from the power supply voltage (peak value) Vin, based on the voltage detected by the voltage detection part 14, by way of the deceleration energy from the motor 3.

By applying the rated voltage to the DC link capacitor 13, i.e. the electrolytic capacitor made using electrolyte such as an aluminum electrolytic capacitor in this way, the leakage current decreases according to the repairing action of the electrolyte.

Next, the control part 17 causes regeneration operation from the motor 3 to the AC power supply 2 to start, when the voltage of the DC link capacitor 13 detected by the voltage detection part 14 reaches the threshold for the applied voltage stored in the first storage part 15, i.e. rated voltage value Vr. More specifically, the control part 17 cause operation of the forward converter 11 to start, by causing the supply of control voltage to the switching element of the forward converter 11 to start (segment T2 in FIG. 2).

Herein, in the electrolytic capacitor made using an electrolyte such as an aluminum electrolytic capacitor, the voltage application exceeding the rated voltage leads to a steep increase in leakage current. Therefore, in the case of there being deceleration energy even though the voltage of the DC link capacitor 13 has reached the rated voltage value, the present embodiment causes the deceleration energy from the motor 3 to regenerate to the AC power supply 2, and prevents the voltage of the DC link capacitor 3 from rising above the rated voltage value.

As explained above, according to the motor drive device 1 of the present embodiment, during activation of the motor drive device 1, obtaining the non-energized period of the DC link capacitor 13 based on the previous energization period, and in the case of the obtained non-energized period being longer than the threshold (threshold for non-energized period of DC link capacitor 13 in which leakage current of the DC link capacitor 13 increases), the regeneration operation from the motor 3 to the AC power supply 2 is stopped after causing the motor 3 to accelerate, and the voltage of the DC link capacitor 13 is made to rise up to the threshold (threshold for applied voltage of the DC link capacitor 13 for causing the leakage current of the DC link capacitor 13 to decrease, i.e. rated voltage value of DC link capacitor 13 or vicinity thereof) by way of the deceleration energy of the motor 3. It is thereby possible to cause the leakage current of the DC link capacitor 13 to decrease, in addition, according to the motor drive device 1 of the present embodiment, the regeneration operation from the motor 3 to the AC power supply 2 is made to start when the voltage of the DC link capacitor 13 reaches the threshold (threshold for applied voltage of DC link capacitor 13, i.e. rated voltage value of DC link capacitor 13 or vicinity thereof). It is thereby possible to prevent the voltage of the DC link capacitor 13 from rising above the rated voltage value, and possible to prevent the leakage current from steeply rising by the voltage exceeding the rated voltage value being applied to the DC link capacitor 13.

However, when the motor drive device operates in a state in which the leakage current of the DC link capacitor increased, it leads to a decline in reliability of the motor drive device, by the heat generation inside of the DC link capacitor increasing, and by the capacity of the DC link capacitor declining. For this reason, conventionally, in a motor drive device for which energization has not been performed over a long period of time, after the DC link capacitor is removed from the motor drive device once, and the rated voltage is applied to the DC link capacitor to cause the leakage current to decrease, the DC link capacitor is installed to the motor drive device again. For this reason, there has been a problem in that time and labor is required.

However, according to the motor drive device 1 of the present embodiment, it is possible to eliminate the time and effort in removing the DC link capacitor 13 from the motor drive device 1 once, applying the rated voltage to the DC link capacitor 13, and installing the DC link capacitor 13 to the motor drive device 1 again, and thus it is possible to reduce the workload of these.

In addition, in the motor drive device 1 of the present embodiment, the threshold for the non-energized period and threshold for applied voltage are rewritable by an external device; therefore, the motor drive device 1 can change these thresholds to appropriate values, even after setting the values once. For example, the present embodiment shows an example of designing the rated voltage of the DC link capacitor 13 as 450 Vdc, in the case of the power supply voltage being 200 Vrms. However, there is a case of the power supply voltage being 400 Vrms, and in this case, the rated voltage of the DC link capacitor 13 will be designed as 900 Vdc. Even in such a case, according to the present embodiment, it is possible to easily change the threshold for the applied voltage from the set 450 Vdc to 900 Vdc.

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

In addition, in the aforementioned embodiment, although the threshold for the applied voltage, i.e. rated voltage, is applied only once to the DC link capacitor 13, it may be applied a plurality of times. As shown in FIG. 2, since it is a short time during which it is possible to apply the rated voltage value Vr to the DC link capacitor 13, it is possible to enhance the leakage current reduction effect, without increasing the number of times of application of the rated voltage value Vr to the DC link capacitor 13.

In addition, with the aforementioned embodiment, although information related to time is acquired from outside in order to recognize the present energization period and previous energization period, a means for generating information related to time of a clock or the like may be equipped to its own device, for example. Alternatively, it may include a means such as a timer that generates information related to the elapsed time from the previous energization period until a present energization period.

In addition, with the aforementioned embodiment, although the previous energization period is defined as the previous stop time of the motor drive device 1, in the case of the continuous operation time of the motor drive motor 1 being short, the previous energization period may be defined as the activation time of the motor drive device 1. In this case, it may update the previous energization period in the second storage part 16 using the present energization period recognized during activation of the motor drive device 1.

EXPLANATION OF REFERENCE NUMERALS

1, 1X motor drive device
2 AC power supply
3 motor
11 forward converter
12 reverse converter
13 DC link capacitor
14 voltage detection part
15 first storage part
16 second storage part
17 control part

What is claimed is:

1. A motor drive device that inputs AC power from a power supply to drive a motor, the motor drive device comprising:
    a forward converter that converts the AC power from the power supply into DC power;
    a reverse converter that converts the DC power from the forward converter into AC power, and supplies to the motor;
    a DC link capacitor provided to a DC link part between the forward converter and the reverse converter;
    a voltage detection part that detects voltage of the DC link capacitor;
    a first storage part that stores in advance a threshold for a non-energized period of the DC link capacitor in which leakage current of the DC link capacitor increases, and a threshold for applied voltage of the DC link capacitor for causing the leakage current of the DC link capacitor to decrease;
    a second storage part that records a previous energization period of the DC link capacitor; and
    a control part that controls voltage of the DC link capacitor,
    wherein the control part
    obtains the non-energized period of the DC link capacitor based on the previous energization period recorded in the second storage part, during activation of the motor drive device, and
    in a case of the non-energized period obtained being longer than the threshold for the non-energized period stored in the first storage part, causes regeneration operation from the motor to the power supply to stop, and causes the voltage of the DC link capacitor to rise up to the threshold for the applied voltage stored in the first storage part, based on the voltage detected by the voltage detection part, by way of deceleration energy of the motor.

2. The motor drive device according to claim 1, wherein the control part causes regeneration operation from the motor to the power supply to start, when the voltage of the DC link capacitor detected by the voltage detection part reaches the threshold for the applied voltage stored in the first storage part.

3. The motor drive device according to claim 1, wherein the control part causes regeneration operation from the motor to the power supply to stop by causing operation of the forward converter to stop.

4. The motor drive device according to claim 1, wherein the control part causes regeneration operation from the motor to the power supply to stop after causing the motor to accelerate, in a case of the non-energized period obtained being longer than the threshold for the non-energized period, during activation of the motor drive device.

5. The motor drive device according to claim 1, wherein the first storage part externally allows for rewriting of the threshold for the non-energized period and the threshold for the applied voltage.

\* \* \* \* \*